United States Patent

Beyer et al.

Patent Number: 5,262,951
Date of Patent: Nov. 16, 1993

[54] ANTI-LOCK BRAKING SYSTEM

[75] Inventors: Claus Beyer, Schwieberdingen; Peter Dominke, Bietigheim-Bissingen; Ulf Herlin, Ludwigsburg; Joachim Bielesch, Mühlacker, all of Fed. Rep. of Germany

[73] Assignee: Robert Bosch GmbH, Stuttgart, Fed. Rep. of Germany

[21] Appl. No.: 691,014

[22] PCT Filed: Nov. 11, 1989

[86] PCT No.: PCT/EP89/01353
 § 371 Date: Jun. 14, 1991
 § 102(e) Date: Jun. 14, 1991

[87] PCT Pub. No.: WO90/06875
 PCT Pub. Date: Jun. 28, 1990

[30] Foreign Application Priority Data
 Dec. 14, 1988 [DE] Fed. Rep. of Germany ....... 3841956

[51] Int. Cl.$^5$ .................................................. B60T 8/58
[52] U.S. Cl. .................. 364/426.02; 303/95; 303/103
[58] Field of Search ............ 364/426.02, 426.03; 180/197; 303/95, 100, 103, 109

[56] References Cited

U.S. PATENT DOCUMENTS

| | | | |
|---|---|---|---|
| 4,675,819 | 6/1987 | Fennel | 364/426.02 |
| 4,693,522 | 9/1987 | Wupper et al. | 364/426.02 |
| 4,736,994 | 4/1988 | Fennel et al. | 364/426.02 |
| 4,818,037 | 4/1989 | McEnnan | 364/426.02 |
| 4,969,100 | 11/1990 | Takata et al. | 364/426.02 |
| 4,970,649 | 11/1990 | Matsuda | 303/103 |
| 4,991,910 | 2/1991 | Shimanuki et al. | 364/426.02 |

OTHER PUBLICATIONS

Bosch Technische Berichte, English special edition (Feb. 1982).

Primary Examiner—Gary Chin
Attorney, Agent, or Firm—Felfe & Lynch

[57] ABSTRACT

An ABS is described in which the wheel slip is used. For this purpose, a reference signal is required, the gradient of which is obtained from an auxiliary reference signal. In order to achieve an even better matching of the reference to the vehicle speed, the gradient is made dependent on the extent of the pressure reduction in a closed-loop control cycle, specifically the gradient is reduced with increasing pressure reduction.

8 Claims, 3 Drawing Sheets

ANTI-LOCK BRAKING SYSTEM

BACKGROUND OF THE INVENTION

From WO 88/06544 (U.S. Ser. No. 392,932, incorporated herein by reference) FIG. 7 with associated description it is known, in an anti-lock control system which uses the slip of the wheels as controlled variable, to generate a reference speed signal and an auxiliary reference speed signal for the purpose of slip formation. In the case of the auxiliary reference speed signal, the fastest wheel determines its curve. The gradient of this auxiliary reference speed signal serves only for the determination of the gradient of the reference speed signal during the instability of a wheel, the magnitude of the reference otherwise being determined by the second-fastest wheel.

SUMMARY OF THE INVENTION

The invention provides a closer approximation of the reference speed to the actual vehicle speed and hence an improvement of closed-loop control overall, in particular in extreme conditions such as $\mu$ jumps and in the case of initial braking.

BRIEF DESCRIPTION OF THE DRAWINGS

An illustrative embodiment of the invention will be described in greater detail with reference to the FIG. 1 shows a block diagram of the illustrative embodiment

DETAILED DESCRIPTION OF THE PREFERRED EMBODIMENTS

Figure 1:
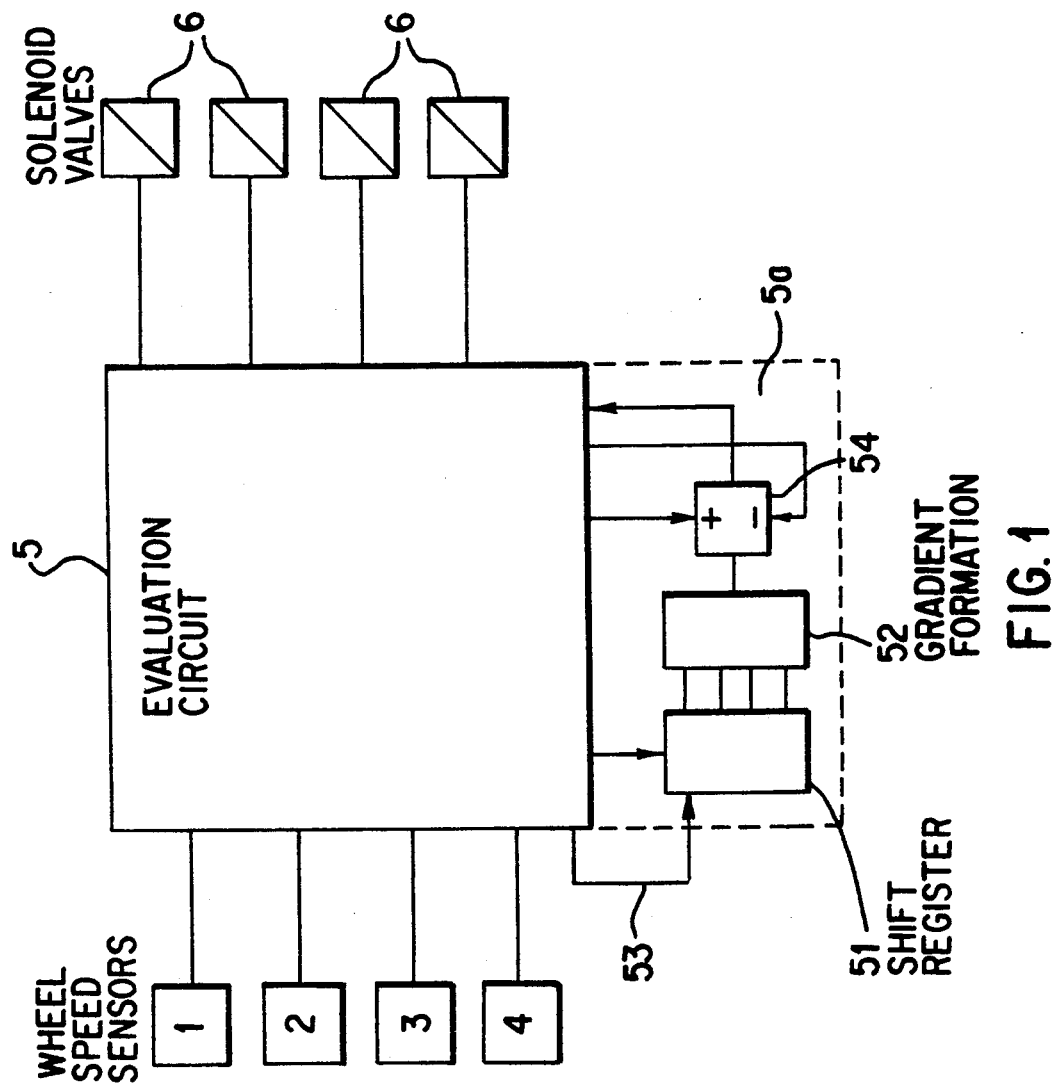
FIG. 1A illustrates the formation of the gradient of the auxiliary reference signal.
FIG. 1B is a graphic illustration of the gradient of the auxiliary reference signal.

In FIG. 1, wheel sensors 1-4 associated with the vehicle wheels, generate and transmit their signals to an evaluation circuit 5. On the basis of the signals from the sensors 1-4, the circuit 5 controls 3/3 solenoid valves 6 associated with the wheels and varies the brake pressure at the wheels so as to avoid too large a brake slip.

For this purpose, the brake slip can be formed and compared with a setpoint brake slip or the slip can be used or involved in closed-loop pressure control in some other way. Slip should here be taken to mean both the difference between the reference speed and the wheel speed and the difference relative to the reference speed.

As shown above, for the purpose of slip formation a reference speed is required. This can be formed in the manner described in WO 88/06544 with reference to FIG. 7. The important point here is that the gradient of an auxiliary reference speed signal is used for its formation. The formation of the reference speed signal, which does not form a subject-matter of this invention, is performed in the evaluation circuit 5 while the formation, according to the invention, of the auxiliary reference speed signal is performed in the lower part 5a of the evaluation circuit.

The evaluation circuit 5 supplies a shift register 51 with the values of the speed of the fastest wheel, determined in the evaluation circuit 5 at a predetermined clock rate. The shift register has $a_1$ places, of which only the last $a_2$, e.g. $a_2 = a_1^3$ are evaluated outside ABS control.

Figure 1A:
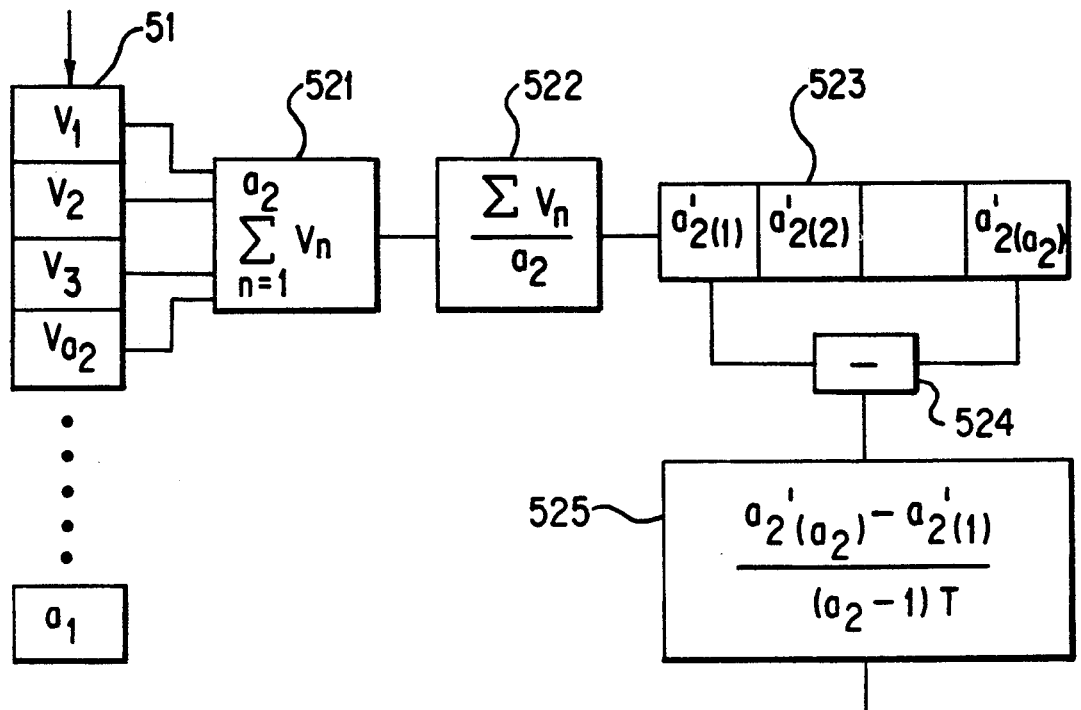
Figure 1B:
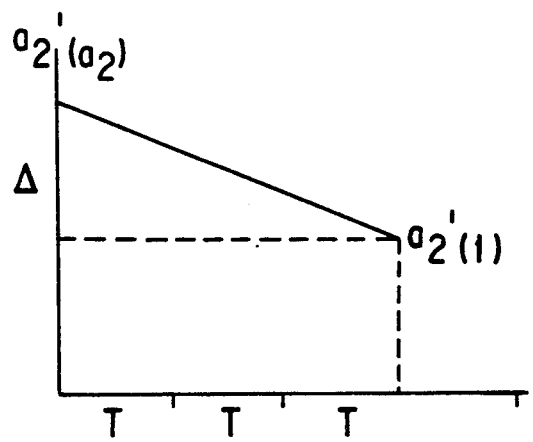

Referring to FIG. 1A, each new measured value input brings the longest-stored of the $a_2$ measured values out of block 51 evaluation. In each clock cycle, those $a_2$ measured values which have just been stored are added up in a block 521 and divided by $a_2$ in block 522. This value $a_2'$ is likewise stored in block 523. The filtered measured value newly obtained is now subtracted from the longest-stored filtered measured value in block 524 and the difference is divided in block 525 by the expression $(a_2 - 1) \cdot T$, T being the clock time. The result is a measure of the gradient of the auxiliary reference signal (FIG. 1B).

Figure 2:
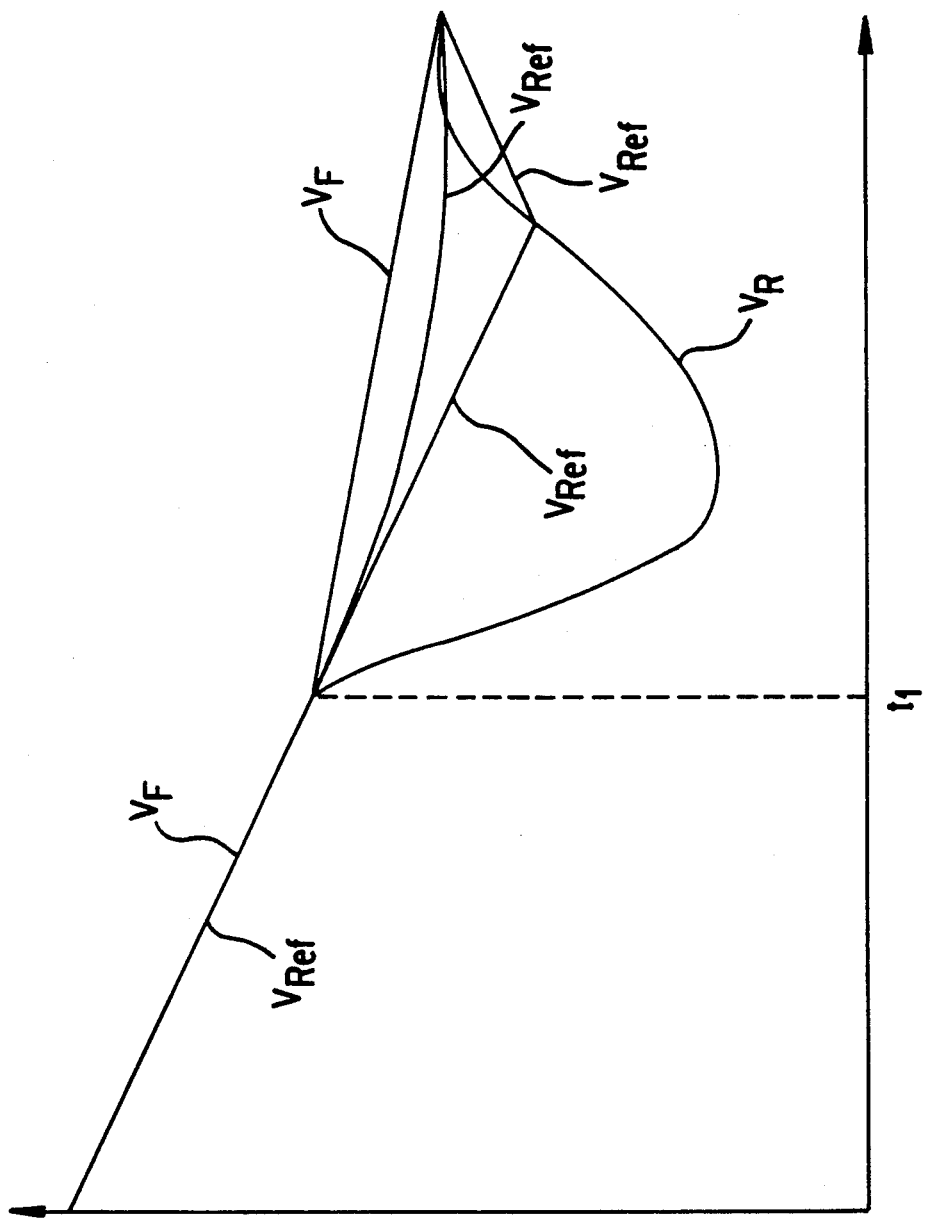
FIG. 2 shows the behaviour of the signals in the case of a negative $\mu$ jump

The number of places which can be evaluated in block 52 can be changed over and is changed over to $a_1$ (e.g. $4a_2$) at the beginning of closed-loop control (line 53). The possibility of changing over has the advantage that a more rapid and better adaptation is obtained during initial braking. The gradient signal at the output of the block 52 is now fed to an adder/subtracter 54. The evaluation circuit 5 contains a time-measuring device which determines the pressure reduction phases at all wheel brakes during a control cycle of each wheel and, as a function of this measured value (sum of pressure reduction times), subtracts a value from the gradient signal. If, upon the occurrence of a negative $\mu$ jump (sheet of ice) at all wheels, there is a virtually simultaneous and pronounced pressure reduction, this measured value is large. The auxiliary reference gradient and hence the reference gradient is thus corrected towards smaller values, this then corresponding of course to reduced vehicle deceleration. The gradient of the auxiliary reference signal $V'_{ref}$ corrected as a function of the pressure in this way is then fed to the evaluation circuit 5 for the determination of the gradient of the reference signal in phases of a slump in rotational speed. The behaviour in the case of a negative $\mu$ jump is shown by FIG. 2, where this $\mu$ jump occurs at $t_1$. The vehicle speed is denoted by $V_F$, the reference signal, which is identical with this up to $t_1$, by $V_{Ref}$ and the wheel speed signal by $V_R$.

As explained above, the pressure reduction time is measured from $t_1$. The sum of the time values measured in each case brings about a substraction in the adder/subtractor 54 in each clock cycle. The auxiliary reference signal and hence also the reference signal $V_{Ref}$ thus has a continuously decreasing (negative) gradient, i.e. from $t_1$ onwards, the reference signal no longer follows the predetermined $V_{Ref}$ but makes a transition to a $V_{Ref}$ which approaches the vehicle speed $V_F$ again much more rapidly, which vehicle speed likewise has a smaller gradient from $t_1$ onwards because of the underlying surface.

In the evaluation circuit 5, it is also established by time measurement whether the initial value prior to pressure reduction is exceeded again during the pressure build-up (end of $\mu$ jump). If this is the case, then in each clock cycle a value dependent on the percentage by which the gradient value is exceeded is added on to the gradient value in the adder 54, the gradient thus being matched again to the gradient of the vehicle speed, which gradient is now also greater.

An appropriately programmed computer can also carry out the functions described instead of the arrangement in FIG. 1.

Outside closed-loop control, low-level filtering is operative since, in the case of hard depression of the brake, a rapid increase in the deceleration is possible. In certain driving conditions, "additional depression" is possible for as long as the fastest-running wheel is not effecting closed-loop control, as a result of which, in turn, deceleration increases (e.g. cornering). It is permissible for filtering to be higher-level here than outside closed-loop control but it must be lower-level than when all wheels are effecting closed-loop control.

We claim:

1. Antilocking control system for preventing locking of wheels of a vehicle during braking, comprising
   wheel speed sensors which generate wheel speed signals for the respective wheels,
   brake pressure control devices for reducing brake pressure at the vehicle wheels in control cycles, each control cycle consisting of a pressure reduction phase and a pressure build-up phase,
   means for determining a reference speed approximating the vehicle speed and generating a reference speed signal,
   means for generating slip signals from the reference speed signal and the wheel speed signals and using said slip signals for controlling said brake pressure control devices,
   means for determining the extent of pressure reduction at said wheels during a control cycle,
   means for generating an auxiliary reference speed signal from the speed of the fastest wheel,
   means for determining the gradient of the auxiliary reference speed,
   control means which, when one of said wheel speed signals exhibits a negative gradient which is steeper than the gradient of the auxiliary reference speed, uses the gradient of the auxiliary reference speed to determine the gradient of the reference speed and changes the gradient of said reference speed dependence upon the extent of said pressure reduction such that the gradient of the reference speed decreases as the pressure reduction during said pressure phase increases.

2. Anti-lock control system according to claim 1 wherein the decrease of the gradient reference speed performed by said pressure reduction is only carried out as long as the acceleration of one of said wheels is between a first threshold value and a second threshold value.

3. Anti-lock control system as in claim 2 wherein said first threshold value is 0 g.

4. Anti-lock control system as in claim 2 wherein said second threshold value is +3 g.

5. Antilocking control system as in claim 1 wherein said means for determining the extent of pressure reduction forms the sum of pressure reduction times of all wheels in each control cycle and uses this sum to determine the decrease in said gradient of the reference speed.

6. Antilocking control system as in claim 1 wherein the reference speed is determined at predetermined small time intervals and a speed increment which is a function of the extent of pressure reduction is added to the reference speed determined in each interval.

7. Antilocking control system as in claim 5 wherein said control means forms the sum of pressure build-up times of all said wheels per said control cycle and increases the gradient of the reference speed when the sum of pressure build-up times in one of said control cycles is greater than the sum of reduction times in a previous one of said control cycles.

8. Anti-lock control system according to claim 7, in which the reference speed is determined in predetermined small time intervals and a speed increment which is a function of the extent of pressure increase is subtracted from the reference speed determined in each interval.